United States Patent [19]
Paglia

[11] 3,810,220
[45] May 7, 1974

[54] DETACHABLE SPREAD ROLLER HOUSING SECTION

[75] Inventor: Richard Paglia, Carlisle, Mass.

[73] Assignee: Polaroid Corporation, Cambridge, Mass.

[22] Filed: Oct. 24, 1972

[21] Appl. No.: 299,668

[52] U.S. Cl. .................................................. 354/212
[51] Int. Cl. .......................................... G03b 17/52
[58] Field of Search .................................. 95/13, 14

[56] References Cited
UNITED STATES PATENTS
3,283,682   11/1966   Rice ..................................... 95/13

Primary Examiner—John M. Horan

[57] ABSTRACT

Photographic apparatus of the self-developing type including a first housing section having an open end chamber for receiving a film assemblage and a second housing section having a pair of processing rollers mounted thereon. The second housing section is pivotally coupled to the first housing section by a pair of laterally spaced brackets, each of which has an aperture therein for receiving an inwardly facing projection mounted on the first housing section. The second housing section is readily disconnected from the first housing section by pivoting the second housing section to a film loading position and then flexing one of the brackets to a position wherein the projection is withdrawn from the aperture. The second housing section is readily connected to the first housing section by reversing the aforementioned steps.

8 Claims, 1 Drawing Figure

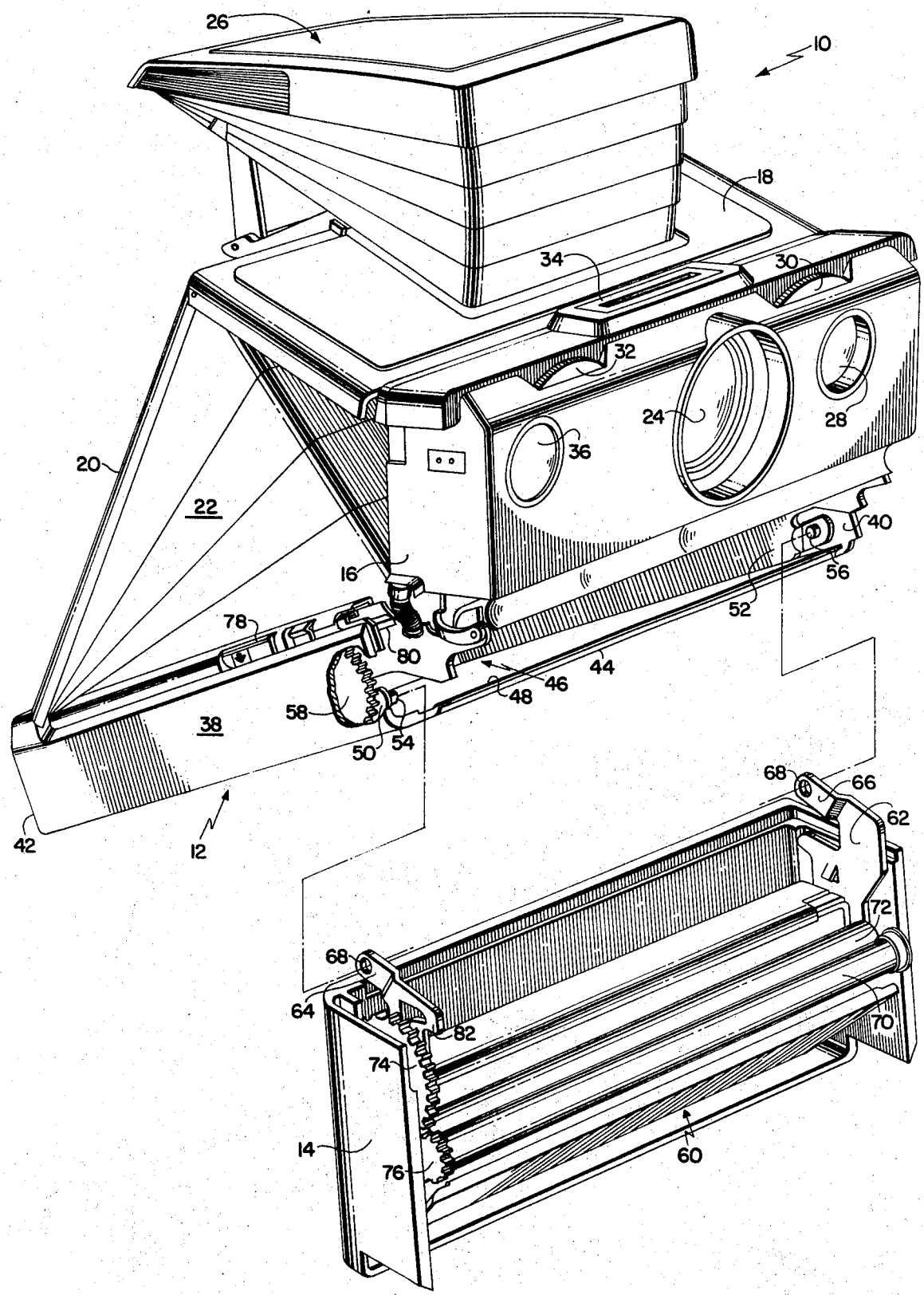

3,810,220

DETACHABLE SPREAD ROLLER HOUSING SECTION

BACKGROUND OF THE INVENTION

1. Field of the Invention

This invention relates to photographic apparatus of the self-developing type.

2. Description of the Prior Art

The present invention is concerned with improvements in photographic apparatus of the self-developing type and, more particularly, with novel means for enabling one to readily remove or detach a roller housing section from the apparatus so as to provide greater acess to components of the apparatus, including the roller assembly, whereby maintenance and/or replacement is facilitated. Generally, photographic apparatus of the self-developing type, e.g., cameras such as those shown in U. S. Pat. Nos. 3,283,682 and 3,643,565 include a chamber for receiving a film assemblage and pressure-applying means, e.g., a pair of rollers, which are adapted to spread a processing liquid across the photosensitive area of an exposed film unit. As is well known in the art, the spatial relationship between the bite of the rollers and the path of travel of an advancing film unit is critical if a proper spread of the processing liquid is to be obtained. For this reason, it has been found beneficial to permanently secure the roller assembly to one of the camera's housing sections by, e.g., screws or rivets, so as to insure the proper spatial relationship between the bite of the rollers and the path of the film unit. The housing section to which the roller assembly is connected is then permanently coupled to the remainder of the camera by a hinge for movement between an operative position wherein the rollers extend across an open end of the film chamber in position to receive a film unit as it is advanced into the bite of the rollers, and an inoperative position wherein a film assemblage may be inserted into or withdrawn from the film chamber via the aforementioned open end. It should be noted at this time that the term "permanently," as used herein, is not being used in the context that the parts can never be uncoupled, for obviously they can by removing the screws, hinges, rivets, etc., but rather that the parts cannot be readily disconnected. While permanently securing the roller assembly to one of the housing sections obviates the aforementioned spatial problem, a new problem arises, i.e., increased difficulty of performing maintenance on the roller assembly and other components of the camera.

SUMMARY OF THE INVENTION

The instant invention relates to photographic apparatus, e.g., cameras of the self-developing type and, more particularly, to a camera of the foregoing type which includes a readily detachable roller housing section. The camera includes a first housing section having means defining an open end chamber for locating a film assemblage in position for exposure of one of the film units located therein and a second housing section having pressure-applying means, e.g., a roller assembly, permanently mounted thereon. The second housing section is pivotally connected to the first housing section for movement between an operative position wherein the rollers of the assembly extend across the open end of the film chamber in position to receive an exposed film unit in its bite as it is being advanced out of its exposure position, and in inoperative position wherein the rollers are spaced from the open end of the film chamber to permit loading or unloading of the film assemblage.

The rollers are mounted on a support member having a pair of laterally spaced arms which extend in cantilever fashion part way into the open end of the film chamber. Each arm has, preferably, an aperture in its free end for receiving an inwardly facing pin mounted on the first housing section for pivotally coupling the two housing sections to each other. The free ends of the arms have a degree of resiliency which enables a user of the camera to readily detach the roller housing section from the remainder of the camera by manually flexing one or both of the arms inwardly until the inwardly facing pins are withdrawn from their respective apertures. Once the roller housing section has been detached from the camera, maintenance, such as cleaning of the rollers or replacement of a component of the roller assembly, is greatly facilitated. For example, the rollers may be cleaned by immersing the entire roller section in a liquid. Also, other components of the camera, e.g., gears mounted within the first housing section, may be repaired or replaced with greater ease because of the absence of any interference set up by the roller housing section.

An object of the invention is to provide photographic apparatus of the self-developing type with a readily detachable roller housing section.

Another object of the invention is to provide novel means for readily connecting a roller housing section to and disconnecting it from a camera of the self-developing type.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWING

For a fuller understanding of the nature and objects of the invention, reference should be had to the following detailed description taken in connection with the accompanying drawing wherein is shown a perspective view of a camera including a roller housing section shown detached from the remainder of the camera.

DETAILED DESCRIPTION OF THE INVENTION

Reference is now made to the drawing wherein is shown photographic apparatus in the form of a camera 10 of the self-developing type. Camera 10, which is of the same general type shown in U. S. Pat. No. 3,643,565 granted to Alfred Bellows on February 22, 1972, includes first, second, third, fourth and fifth housing sections 12, 14, 16, 18 and 20, respectively, pivotally coupled for movement between an erect position as shown and a compact folded position wherein the camera assumes a generally parallelepiped configuration. Housing sections 12, 16, 18 and 20 cooperate with an expansible bellows 22 to form an exposure chamber through which an image from lens and shutter assembly 24 passes to a collapsible viewfinder 26. Housing section 16 includes, in addition to the lens and shutter assembly 24, a photocell window 28, a wheel 30 for varying the intensity of light incident upon the photocell (not shown), a focusing wheel 32, a flash socket 34 and an exposure cycle initiating button 36.

First housing section 12 includes laterally spaced side walls 38 and 40 and an end wall 42 interconnected by a bottom wall 44 to define a film chamber 46 having an open end 48. Mounted within film chamber 46 are a second pair of side walls 50 and 52 each of which has an inwardly facing projection 54 and 56 mounted thereon. Walls 38 and 50 define a channel for receiving a plurality of gears 58 (only one of which is shown) which extend substantially along one side of the camera and function to couple the camera's motor (not shown) with a processing roller assembly 60.

Roller assembly 60 includes a generally U-shaped bracket 62 which is permanently secured to housing section 14 by any suitable means, e.g., screws, rivets, etc. Bracket 62 includes a pair of laterally spaced arms or flanges 64 and 66 extending therefrom in cantilever fashion for connection with the inwardly facing projections 54 and 56. Each arm preferably includes an aperture 68 therein for receiving one of the projections 54 and 56 to pivotally couple housing section 14 to housing section 12. Also, although each arm is substantially rigid, it has a degree of resiliency which enables it to be flexed inwardly a distance at least equal to that needed to move its aperture out of operative connection with its corresponding protrusion. Bracket 62 includes means (not shown) for rotatably mounting a pair of rollers 70 and 72 and a gear 74. Gear 74 in turn is mounted in operative engagement with a gear 76 secured to one end of roller 70. Gears 58, 74 and 76 comprise a drive means for rotating roller 70. Gear 74 is adapted to be moved out of engagement with one of the gears 58 in response to disconnecting the second housing section from the first housing section thereby rendering the drive means inoperative to drive the roller 70. For a more detailed description of the roller assembly, reference is made to the copending application of R. Paglia, Ser. No. 246,817, filed April 24, 1972 and assigned in common herewith.

When it is desired to insert a new film assemblage into film chamber 46, the photographer merely depresses a button 78 to move a latch 80 out of locking engagement with an extension 82 on bracket 62. Roller housing section 14 is then free to be pivoted in a clockwise manner about protrusions 54 and 56 from a first position wherein the rollers 70 and 72 extend across the open end 48 of chamber 46 in position to receive an exposed film unit as it is moved out of its exposure position, to a second position wherein the sound housing section is generally perpendicular to the first housing section and is out of alignment with the open end of the film chamber, thereby allowing the film assemblage to be withdrawn from the film chamber via open end 48. If at this time the photographer wishes to perform any maintenance on the roller assembly, he may readily detach the roller housing section 12 from the remainder of the camera by flexing one of the arms 64 and/or 66 inwardly until the protrusion 54 or 56 has been withdrawn from aperture 68. Once the protrusions have been withdrawn from the apertures, as shown in the drawing, maintenance and/or replacement of components of the camera is greatly facilitated due to the greater ease with which one can get to various parts of the camera. After the maintenance has been completed, the roller assembly is readily connected to the remainder of the camera by positioning one of the apertures around one of the protrusions and flexing the arm having the other aperture inwardly until the other protrusion is located in alignment with the other aperture. Inward pressure on the other arm is then reduced to allow the arm to move outwardly to a position in which the protrusion is located within the aperture. After the connection has been made, a new film assemblage may be inserted into chamber 46 and housing section 12 pivoted in a counterclockwise manner to its normal operative position wherein the rollers extend across the open end of the chamber and the housing section locked in place by latch 80. Movement of roller housing section into its operative position moves gear 74 into mesh with gear 58 whereby roller 70 may be driven by the camera's motor. It should be noted at this point that when the present invention is used in conjuction with a camera of the folding type, as shown herein, accidental detachment of the roller housing section from the remainder of the camera, when the camera is folded, is precluded since the arms 64 and 66 are exposed only when the camera is out of the folded position. Stated another way, roller housing section 12 cannot be moved to a position wherein one of the arms 64 or 66 may be manually flexed until the other housing sections of the camera have been moved to a position in which roller 70 can clear housing section 16.

From the foregoing it can be seen that there has been disclosed a new and unobvious means for coupling a processing roller housing section to another housing section of a camera in a manner which permits rapid connecting and disconnecting of the two housing sections. While the connecting means has been shown and described as a pair of protrusions and a pair of apertures, it is within the scope of the invention to replace one or both of the apertures with an inwardly directed depression for pivotally receiving one of the protrusions.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Photographic apparatus of the self-developing type comprising:

a first housing section including means defining a chamber for receiving a film assemblage, said chamber having an open end through which a film assemblage is adapted to be inserted;

a second housing section including processing means extending forwardly of said first housing section in closing relation to said open end;

means for coupling said second housing section to said first housing section for movement between a first position wherein said processing means extend across said open end in position to receive a film unit as it moves from said first housing section to said second housing section and a second position wherein said processing means are located out of alignment with said open end to permit a film assemblage to be inserted into said chamber, said coupling means including manually actuatable means for readily disconnecting said second housing section from and connecting it to said first housing section; and means including said second housing section for preventing actuation of said manually actuatable means when said second housing section is in said first position.

2. Photographic apparatus as defined in claim 1 wherein said processing means includes a pair of rollers.

3. Photographic apparatus of the self-developing type comprising:
a first housing section including means defining a chamber for receiving a film assemblage, said chamber having an open end through which a film assemblage is adapted to be inserted;
a second housing section including processing means including a pair of rollers extending forwardly of said first housing section in closing relation to said open end;
means for coupling said second housing section to said first housing section for movement between a first position wherein said processing means extend across said open end in position to receive a film unit as it moves from said first housing section to said second housing section and a second position wherein said processing means are located out of alignment with said open end to permit a film assemblage to be inserted into said chamber, said coupling means including manually actuatable means for readily disconnecting said second housing section from and connecting it to said first housing section; and
drive means extending between said first and second housing sections and operatively connectable with at least one of said rollers for rotating the latter, said drive means including means responsive to disconnecting said second housing section from said first housing section for rendering said drive means inoperative to drive said one roller.

4. Photographic apparatus as defined in claim 3 wherein said responsive means is adapted to render said drive means operative to drive said one roller upon connecting said second housing section to said first housing section.

5. Photographic apparatus of the self-developing type comprising:
a first housing section including means defining a chamber for receiving a film assemblage, said chamber having an open end through which a film assemblage is adapted to be inserted;
a second housing section including processing means extending forwardly of said first housing section in closing relation to said open end; and
means for coupling said second housing section to said first housing section for movement between a first position wherein said processing means extend across said open end in position to receive a film unit as it moves from said first housing section to said second housing section and a second position wherein said processing means are located out of alignment with said open end to permit a film assemblage to be inserted into said chamber, said coupling means including a pair of spaced arms mounted on one of said first or said second housing sections and a pair of inwardly facing projections mounted on the other of said first or second housing sections, said arms including means for rotatably receiving said projections and manually actuatable means for readily disconnecting said second housing section from and connecting it to said first housing section.

6. Photographic apparatus as defined in claim 5 wherein said manually actuatable means includes at least one of said arms.

7. Photographic apparatus as defined in claim 6 wherein said one arm is resilient and is adapted to be manually flexed to a position out of engagement with its associated projection to disconnect said second housing section from said first housing section.

8. Photographic apparatus as defined in claim 5 wherein said means for rotatably receiving said projections includes at least one aperture.

* * * * *